(12) United States Patent
Sutton et al.

(10) Patent No.: US 10,111,382 B2
(45) Date of Patent: Oct. 30, 2018

(54) MID-MOUNT RIDING GRASS MOWER WITH A MOWER UNIT COVER

(71) Applicant: Kubota Corporation, Osaka-shi (JP)

(72) Inventors: Phillip Sutton, Gainesville, GA (US); Andrew Thornton, Gainesville, GA (US)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/267,376

(22) Filed: Sep. 16, 2016

(65) Prior Publication Data

US 2018/0077859 A1 Mar. 22, 2018

(51) Int. Cl.
| | |
|---|---|
| A01D 34/81 | (2006.01) |
| A01D 34/82 | (2006.01) |
| A01D 34/64 | (2006.01) |
| A01D 34/00 | (2006.01) |
| A01D 34/74 | (2006.01) |
| A01D 69/00 | (2006.01) |
| A01D 34/66 | (2006.01) |
| A01D 101/00 | (2006.01) |

(52) U.S. Cl.
CPC ........... *A01D 34/81* (2013.01); *A01D 34/001* (2013.01); *A01D 34/64* (2013.01); *A01D 34/66* (2013.01); *A01D 34/74* (2013.01); *A01D 34/828* (2013.01); *A01D 69/00* (2013.01); *A01D 2101/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,522,694 A | * | 8/1970 | Horn | A01D 34/828 56/16.9 |
| 5,860,272 A | | 1/1999 | Griffin | |
| 7,469,525 B2 | * | 12/2008 | Zeigler | A01D 34/828 56/320.1 |
| 7,987,657 B2 | * | 8/2011 | Yoshihara | A01D 34/828 56/1 |
| 2004/0040275 A1 | * | 3/2004 | Ishii | A01D 69/03 56/10.8 |
| 2008/0236125 A1 | | 10/2008 | Sugio et al. | |
| 2009/0282796 A1 | | 11/2009 | Yoshihara et al. | |

FOREIGN PATENT DOCUMENTS

| | | | | |
|---|---|---|---|---|
| EP | 1862054 A1 | * | 12/2007 | ............ A01D 34/81 |
| EP | 2119337 A1 | | 11/2009 | |
| FR | 2943492 B3 | * | 3/2011 | ............ A01D 34/81 |
| JP | 2007300806 A | | 11/2007 | |
| JP | 2009296900 A | | 12/2009 | |

* cited by examiner

*Primary Examiner* — Alicia Torres
(74) *Attorney, Agent, or Firm* — The Webb Law Firm

(57) ABSTRACT

A mid-mount riding grass mower includes a belt transmission device attached to an upper portion of a mower unit, and a cover unit that covers the belt transmission device. The cover unit includes a lower cover extending upward from the mower deck so as to surround three sides of the belt transmission device, and right and left side covers detachably attached to right and left end portions of the traveling vehicle body. The lower cover has an upper end disposed higher than an upper end of the belt transmission device and has a vertical length for forming a maintenance space relative to a front/rear intermediate lower portion of the traveling vehicle body when the mower unit is located at its lower limit position.

13 Claims, 11 Drawing Sheets

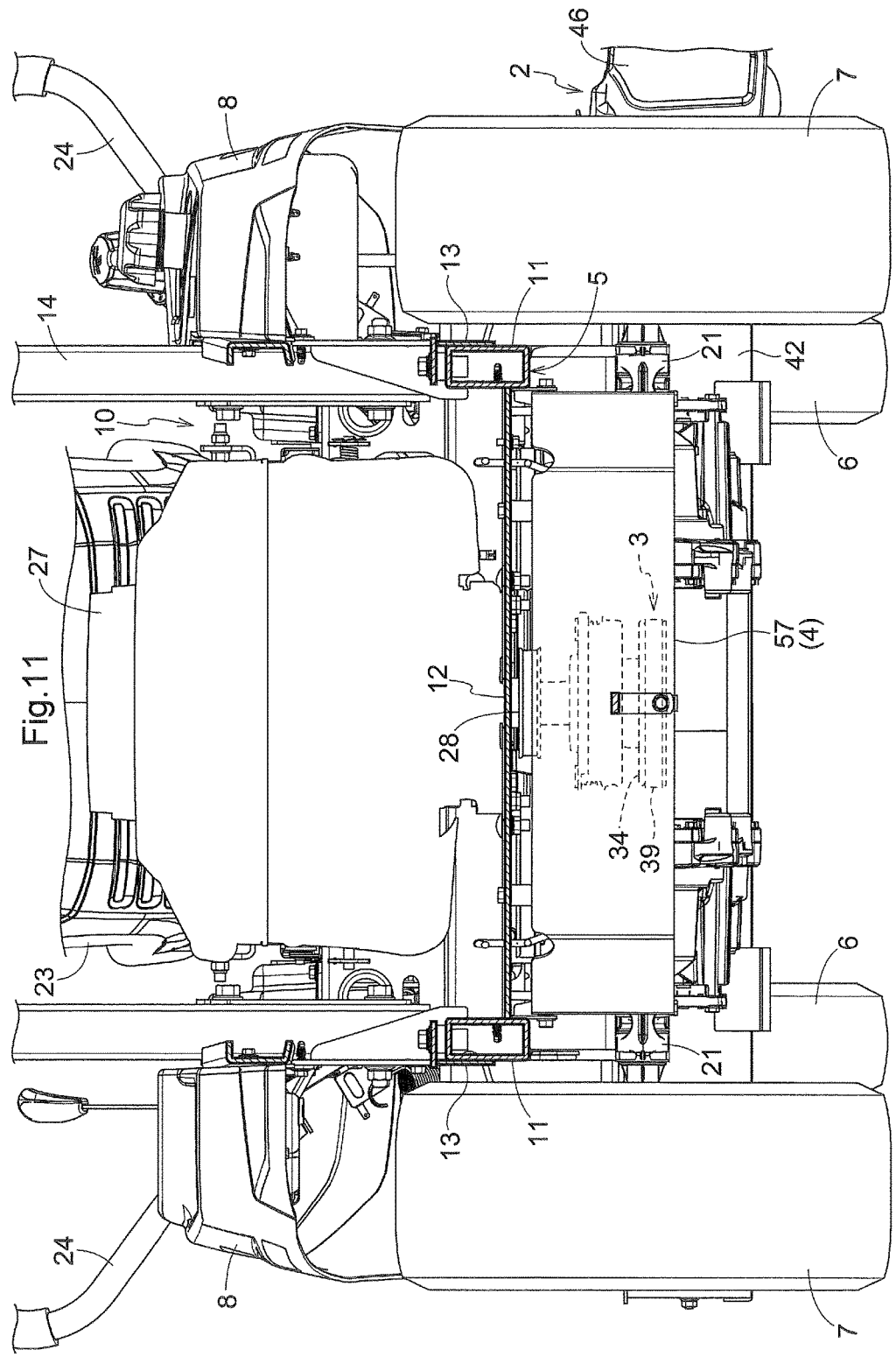

MID-MOUNT RIDING GRASS MOWER WITH A MOWER UNIT COVER

BACKGROUND OF THE INVENTION

Field of the Invention

This disclosure relates to a mid-mount riding grass mower including a traveling vehicle body, a mower unit liftably suspension-supported at a front/rear intermediate lower portion of the traveling vehicle body, a belt transmission device attached to an upper portion of the mower unit, and a cover unit that covers the belt transmission device.

Description of Related Art

As examples of the mid-mount riding grass mower noted above, there are known a riding lawn mower disclosed in EP 2119337 A1, a riding grass mower disclosed in JP 2007 300806 A and a riding grass mower disclosed in JP 2009 296900 A.

The riding lawn mower disclosed in EP 2119337 A1 includes a transmission section as the belt transmission device and includes, as the cover unit, a cutter deck protruding to the right and left sides from the traveling vehicle body and right and left side covers covering right and left end portions of the transmission unit. The right and left side covers are detachably attached to right and left side frames of the traveling vehicle body. The right and left covers include a plurality of small holes that allow viewing of the cutter deck from the outside of the covers for a range facing the lateral portions of the cutter deck.

The riding grass mower disclosed in JP 2007 300806 A includes, as the belt transmission device, a cutter blade drive mechanism attached to an upper portion of a mower device and a transmission mechanism for transmitting power from an engine of a self-propelled traveling vehicle body to the cutter blade drive mechanism. The mower includes, as the cover unit, right and left drive mechanism covers covering the right and left end portions of the cutter blade drive mechanism and a transmission cover device covering the transmission mechanism. The transmission cover device includes right and left output section covers, right and left side covers, etc. The right and left output section covers are coupled to the self-propelled traveling vehicle body. The right and left side covers include traveling vehicle body side separate covers attached to right and left main frames disposed on right and left ends of the self-propelled traveling vehicle body and housing side separate covers attached to right and left drive mechanism covers. And, lower end overlapping portions of the traveling vehicle body side separate covers and overlapped with upper end overlapping portions of the housing side separate covers.

The riding grass mower disclosed in JP 2009 296900 A includes, as the belt transmission device, a transmission pulley and a belt that are disposed at upper portions of a mower deck and further includes, as the cover unit, a belt cover that covers the transmission pulley and the belt. the belt cover can be separated into a right cover portion and a left cover portion, which are attached to an upper portion of the mower deck.

With the arrangement disclosed in EP 2119337 A1, it is possible for the right and left side covers to restrict accumulation of cut lawn clippings scattered during a work on the upper face of the cutter deck or inside the transmission cover. Further, since an operator can carry out attachment and detachment of the right and left side covers from the lateral outer sides of the traveling vehicle body, so that removal of cut lawn clippings accumulated e.g. on the upper face of the cutter deck easily. However, as the right and left side covers include the plurality of small holes, there is possibility of a tool such as a driver having an elongated shank portion being inadvertently inserted into a small hole of the side covers. And, if such erroneous insertion takes place, this may invite such inconvenience as inadvertent contact between the tool as the transmission section. That is, there remains room for improvement in the respect of avoidance of inadvertent contact between the transmission section and an object such as a tool.

With the arrangement disclosed in JP 2007 300806 A, it is possible for the right and left drive mechanism covers and the transmission cover device to avoid inadvertent contact of an object, such as the elongated tool as described above, with the cutter blade drive mechanism or the transmission mechanism. However, when a maintenance operation such as belt replacement operation is to be effected for the cutter blade drive mechanism or the transmission mechanism, an operator needs to detach the right and left output section covers and the right and left housing side separate covers, etc. from the self-propelled traveling vehicle body and needs to detach also the right and left housing side separate covers from the upper portion of the grass mover device. That is, there remains room for improvement in the respect of readiness of maintenance such as belt replacement operation for the cutter blade drive mechanism and the transmission mechanism.

With the arrangement disclosed in JP 2009 296900 A, it is possible for the belt cover to avoid inadvertent contact of an object, such as the elongated tool as described above, with the transmission pulley or the belt. However, when a maintenance operation such as belt replacement operation is to be effected, an operator needs to detach the belt cover from the mower deck by crawling under the traveling vehicle body. Namely, there remains room for improvement in the respect of readiness of maintenance such as replacement of the belt disposed at an upper portion of the mower deck.

In view of the above respects, there is a need for greater readiness of maintenance for a belt transmission device in spite of provision of a cover unit for avoiding inadvertent contact of an object with the belt transmission device.

SUMMARY OF THE INVENTION

As a solution to the above problem, a mid-mount riding grass mower according to one aspect of the present disclosure is as under:

A mid-mount riding grass mower comprising:
a traveling vehicle body;
a mower unit liftably suspension-supported at a front/rear intermediate lower portion of the traveling vehicle body;
a belt transmission device attached to an upper portion of the mower unit; and
a cover unit that covers the belt transmission device;
wherein the mower unit includes a blade rotatable with a driven pulley of the belt transmission device, and a mower deck that covers the blade from the above;
the cover unit includes a lower cover extending upward from a position on more traveling vehicle body outer side than the belt transmission device in the mower deck, and right and left side covers detachably attached to right and left end portions of the traveling vehicle body;
the lower cover has an upper end disposed higher than an upper end of the belt transmission device, the lower cover having a vertical length for forming a maintenance space relative to the front/rear intermediate lower portion of the traveling vehicle body when the mower unit is located at its lower limit position; and each of the right and left side covers has a vertical wall that is overlapped with the lower cover as seen in a right/left direction in a lifting range of the mower unit.

With the above solution, the belt transmission device can be covered by the lower cover and the right and left side covers, irrespectively of a height position of the mower unit. With this, for instance, when an object such as an elongated tool is inserted beneath the traveling vehicle body from an outer side of this traveling vehicle body, inadvertent contact between this object and the belt transmission device can be avoided.

And, when effecting a maintenance operation for the belt transmission device such as belt replacement operation, an operator can open up the gap between the lower cover and the front/rear intermediate lower portion of the traveling vehicle body as a maintenance space by detaching the right and left side covers from the traveling vehicle body with placing the mower unit at its lower limit position. And, through this maintenance space, the maintenance operation for the belt transmission device such as belt replacement operation can be carried out smoothly without inviting the inconvenience of the presence of the lower cover presenting obstruction to the operation.

Moreover, the detachment of the respective side covers from the traveling vehicle body can be carried out easily from the lateral outer side of this traveling vehicle body.

Consequently, it has become possible to achieve greater readiness of maintenance for a belt transmission device in spite of provision of a cover unit for avoiding inadvertent contact of an object with the belt transmission device.

According to a preferred solution provided by this disclosure:

the lower cover includes an inner wall body disposed within a right/left width of the traveling vehicle body, and right and left outer wall bodies disposed on the lateral outer sides of the traveling vehicle body; and the inner wall body has a horizontal extension portion that extends horizontally from its upper end toward the belt transmission device.

With this solution, even if a tool or the like inserted beneath the traveling vehicle body should inadvertently enter the space between the inner wall body and the front/rear intermediate lower portion of the traveling vehicle body, the horizontal extension portion can inhibit this tool or the like from being inclined towards the belt transmission device disposed downward.

As a result, the possibility of an object such as a tool coming into inadvertent contact with the belt transmission device through the space (gap) between the inner wall body and the front/rear intermediate lower portion of the traveling vehicle body can be avoided in an even more reliable manner.

According to a preferred solution provided by this disclosure:

the traveling vehicle body includes a boarding step upwardly of the mower unit;

each of the right and left side covers have an upper wall extending from an upper end of the vertical wall associated therewith over and across the traveling vehicle body on a lateral outer side of the boarding step associated therewith; and the upper wall has a vertical wall side end portion thereof which extends more downward to the outer side than a traveling vehicle body side end portion thereof.

With this solution, when an operator gets on/off the vehicle via the boarding step, possibility of erroneous stepping on the upper walls of the respective side covers by the operator can be decreased.

As a result, the possibility of damage to the respective side covers by erroneous stepping on the upper walls of the respective side covers by the operator can be avoided even more reliably.

According to a preferred solution provided by this disclosure:

each of the right and left upper walls has a traveling vehicle body side end portion thereof disposed lower than a boarding face positioned on the right and left sides of the boarding step.

With this solution, the possibility of erroneous stepping on the upper walls of the respective side covers by the operator can be further decreased.

As a result, the possibility of damage to the respective side covers by erroneous stepping on the upper walls of the respective side covers by the operator can be avoided even more reliably.

According to a preferred solution provided by the present disclosure:

the right and left vertical walls are disposed on more outer sides of the traveling vehicle body than the lower cover;

the lower cover has right and left lateral walls disposed downwardly of the right and left upper walls; and each of the right and left lateral wall has an upper portion thereof which is inclined toward the traveling vehicle body side, and an upper end portion thereof which is disposed downwardly of the traveling vehicle body side end portion of the right/left upper wall associated therewith.

With this solution, even when the vertical wall sides of the respective upper walls are formed to extend downwards to the outer side in order to further decrease the possibility of operator's stepping thereon inadvertently, it is still possible to avoid the possibility of inadvertent contact of the upper portions of the respective lateral walls with e.g. the upper walls in the course of elevation of the mower unit, without having to decrease the upward extension of the respective lateral walls. Thus, without decreasing the lifting range of the mower unit, the state of the right and left lateral walls being overlapped with the right and left vertical walls can be maintained.

As a result, without decreasing the lifting range of the mower unit, it is still possible to provide the means even more reliably for avoiding contact between an object such as tool with the belt transmission device and avoiding the damage of the respective side covers being inadvertently stepped on by an operator.

According to a preferred solution provided by the present disclosure:

the traveling vehicle body includes right and left wheels, and an engine section having an output shaft extending downward toward a space between the right and left wheels;

the belt transmission device includes a drive pulley rotatable with the output shaft; and the right and left side covers extend to respective vicinities of the right and left wheels.

With the above solution, the drive pulley side of the belt transmission device disposed between the lower cover and the right and left wheels can be covered by the right and left side covers. Thus, it is possible to avoid possibility of a tool or the like coming into inadvertent contact with the drive pulley side of the belt transmission device from between the lower cover and the right and left wheels.

And, when a maintenance operation such as belt replacement operation is to be effected for the belt transmission device, the operator can open up the maintenance space between the lower cover and the front/rear intermediate lower portion of the traveling vehicle body with extension of this space to between the lower cover and the right and left wheels, by detaching the right and left side covers from the traveling vehicle body with placing the mower unit at its lower limit position. And, through this maintenance space elongated in the front/rear direction, the maintenance operation such as belt replacement operation for the belt transmission device can be effected.

Consequently, the possibility of inadvertent contact between an object such as a tool with the drive pulley side of the belt transmission device can be avoided, without impairing the readiness of maintenance for the belt transmission device.

According to a preferred solution provided by this disclosure:

the cover unit includes a drive-side cover which extends downward from the traveling vehicle body, at a position on more traveling vehicle body outer side than the drive pulley in the traveling vehicle body front/rear direction between the right and left wheels; and the drive-side cover has a lower end thereof which is located lower than an lower end of the drive pulley.

With the above solution, the drive pulley side of the belt transmission device disposed between the right and left wheels can be covered by the drive-side cover disposed closer to one front/rear end side of the traveling vehicle body than the drive pulley.

As a result, it is possible to avoid the possibility of an object such as a tool inserted beneath the traveling vehicle body from the one front/rear end side of the traveling vehicle body coming into inadvertent contact with the drive pulley side of the belt transmission device from between the right and left wheels.

BRIEF DESCRIPTION OF THE DRAWINGS

FIG. 11 is a rear view in vertical section of principal portions showing e.g. a shape and layout of a drive-side cover.

DESCRIPTION OF THE INVENTION

Next, an embodiment of the present disclosure will be described with reference to the accompanying drawings.

Figure 1:
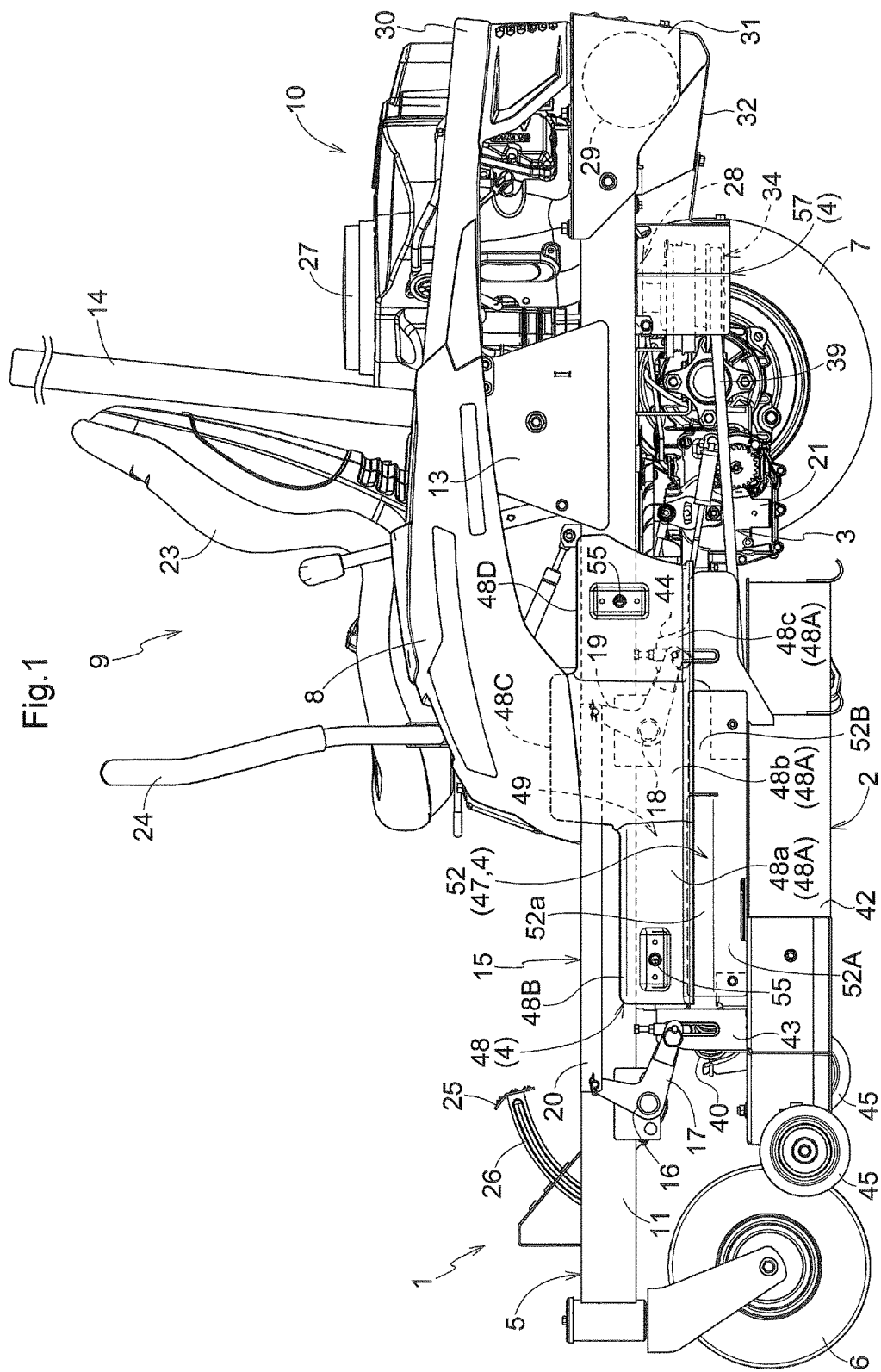
FIG. 1 is a left side view in partial vertical section showing a mid-mount riding grass mower having its mower unit being located at is lower limit position.
Figure 2:
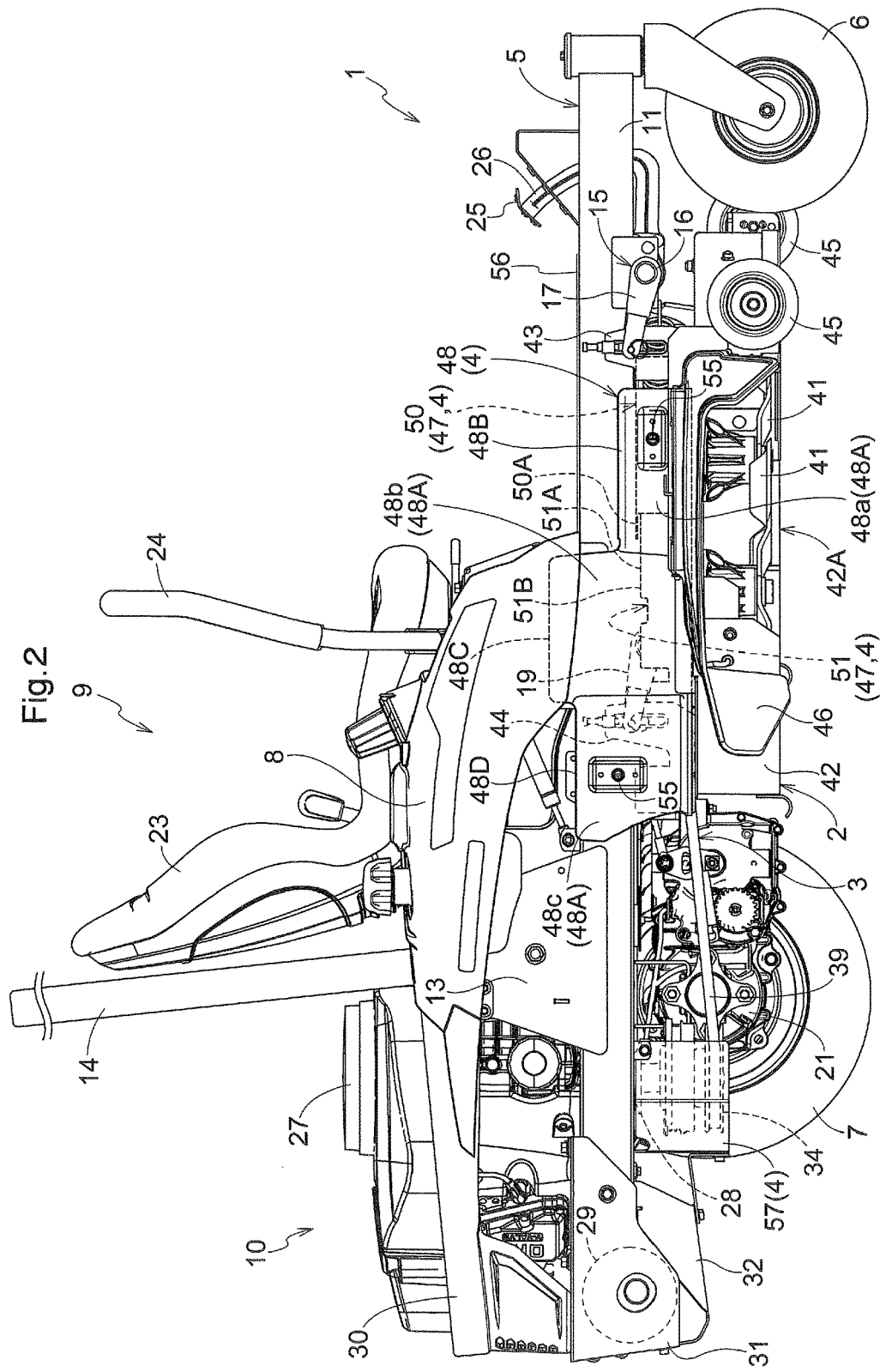
FIG. 2 is a right side view in partial vertical section showing the mid-mount riding grass mower having its mower unit being located at is upper limit position.
Figure 3:
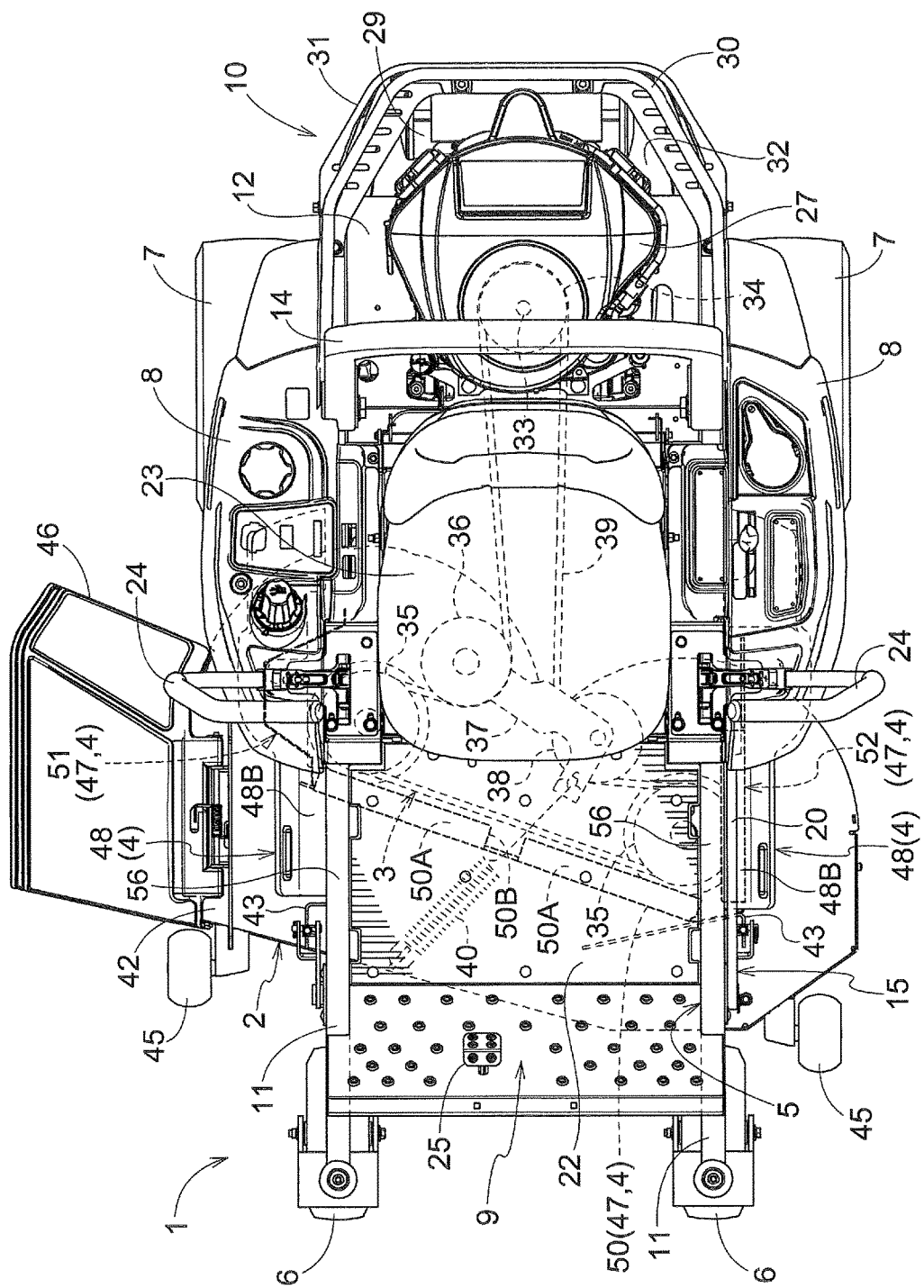
FIG. 3 is a plan view showing the mid-mount riding grass mower.
Figure 4:
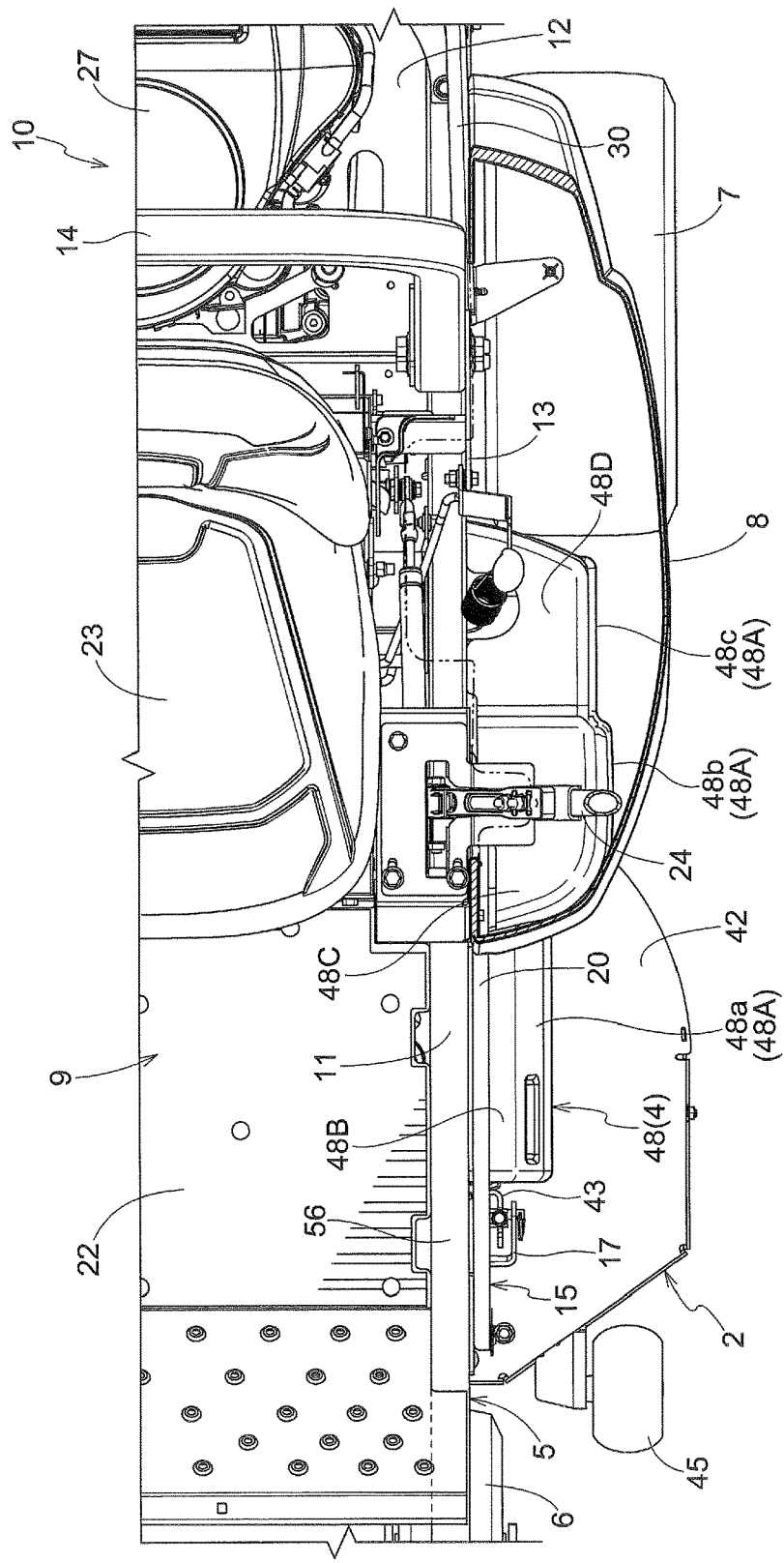
FIG. 4 is a plan view in partial section of principal transversal portions such as a shape and layout of side covers, etc.
Figure 5:
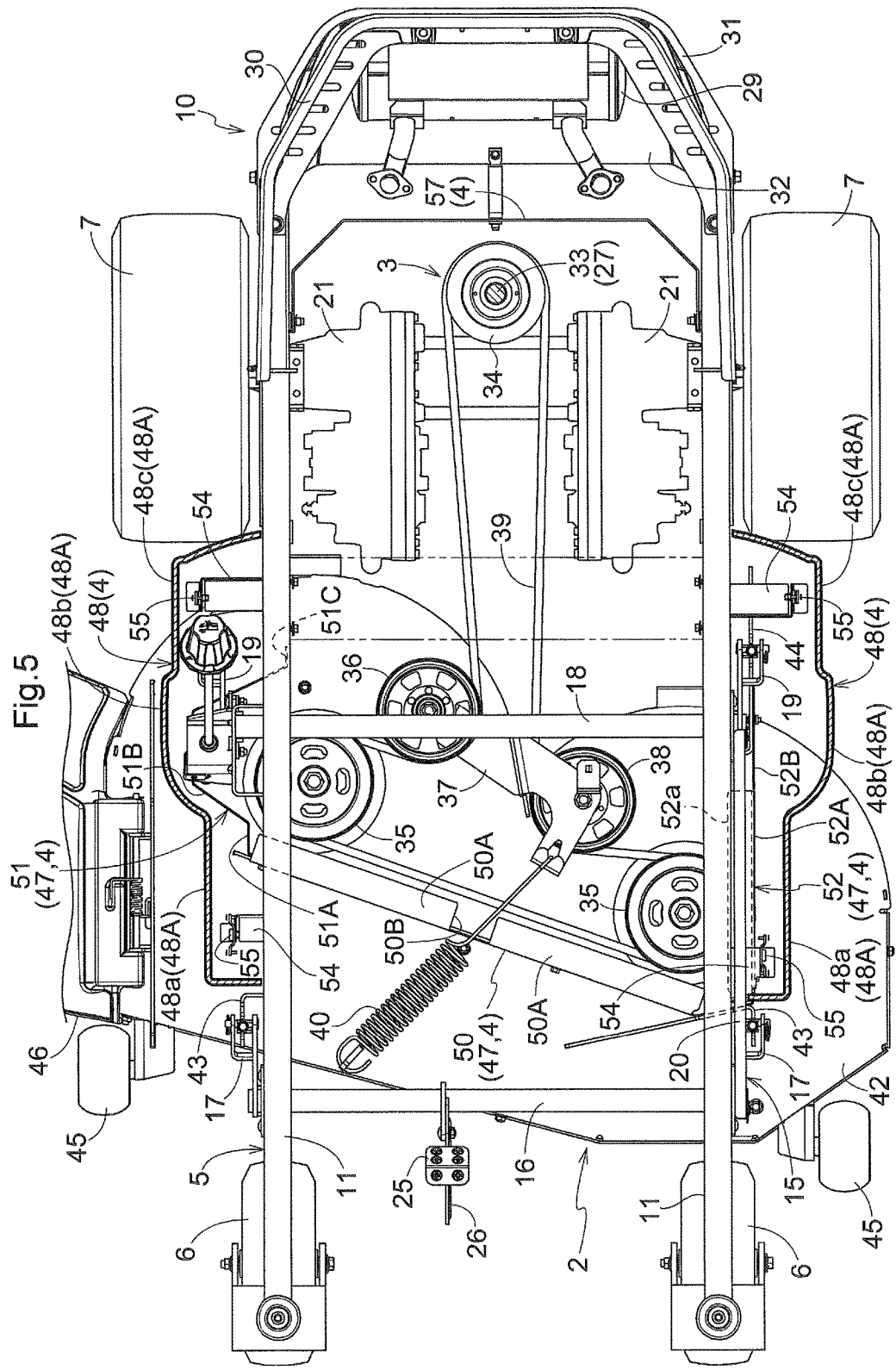
FIG. 5 is a plan view in transversal section of the mid-mount riding grass mower showing a configuration of a cover unit, etc.
Figure 6:
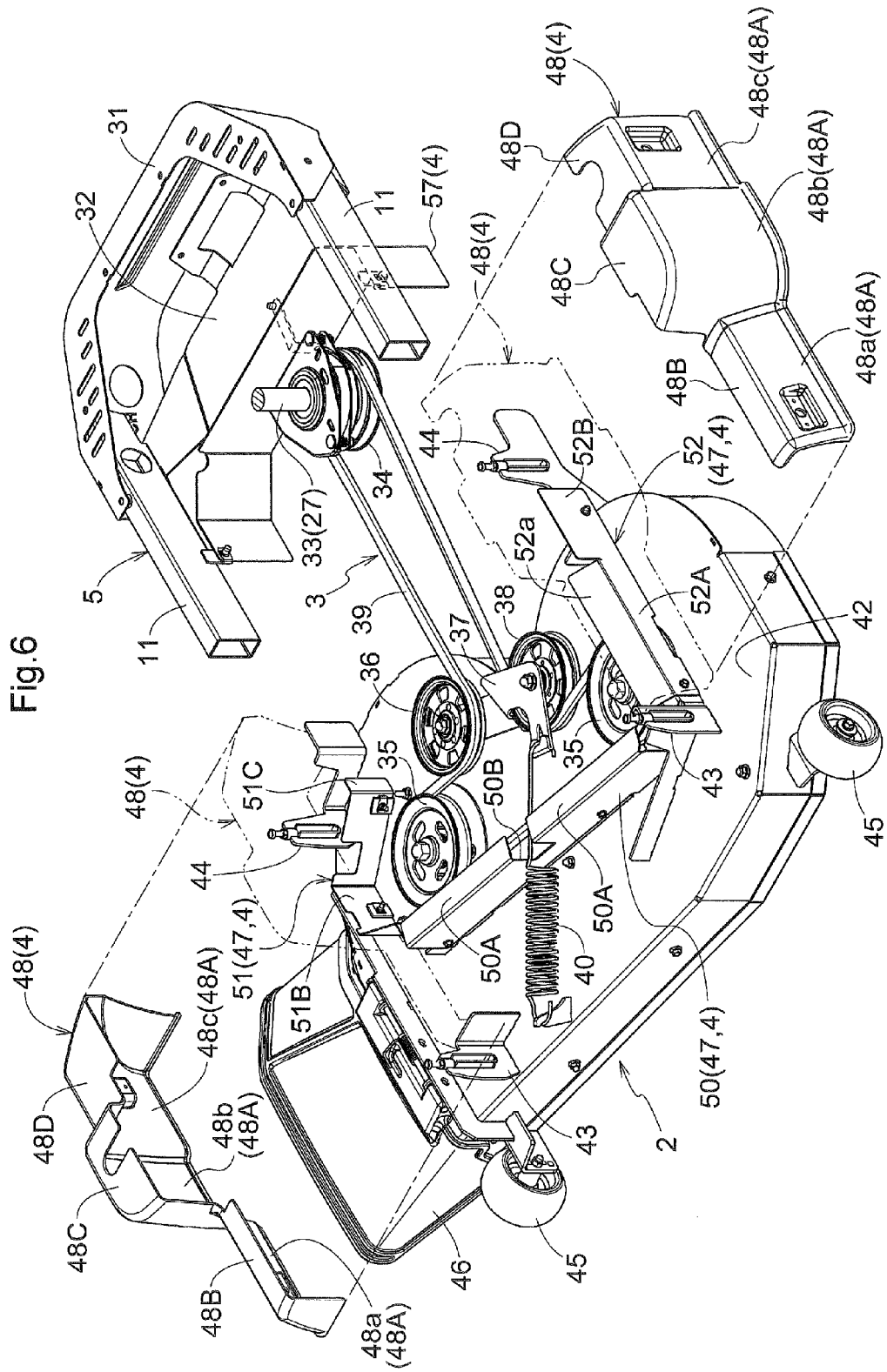
FIG. 6 is an exploded perspective view of principal portions showing e.g. the configuration of the cover unit.
Figure 7:
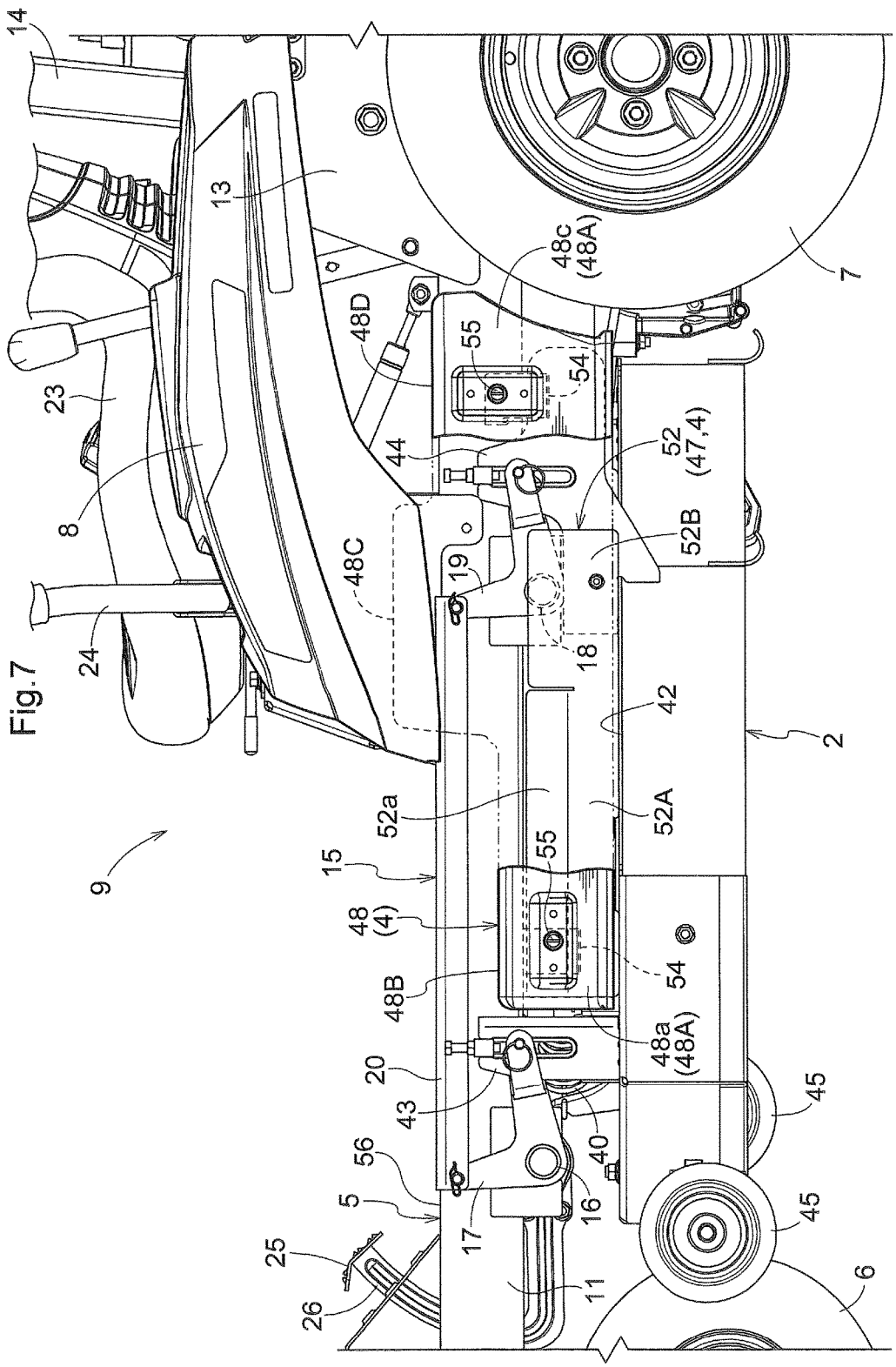
FIG. 7 is a left side view of principal portions showing a state of the cover unit when the mower unit is located at the upper limit position.
Figure 8:
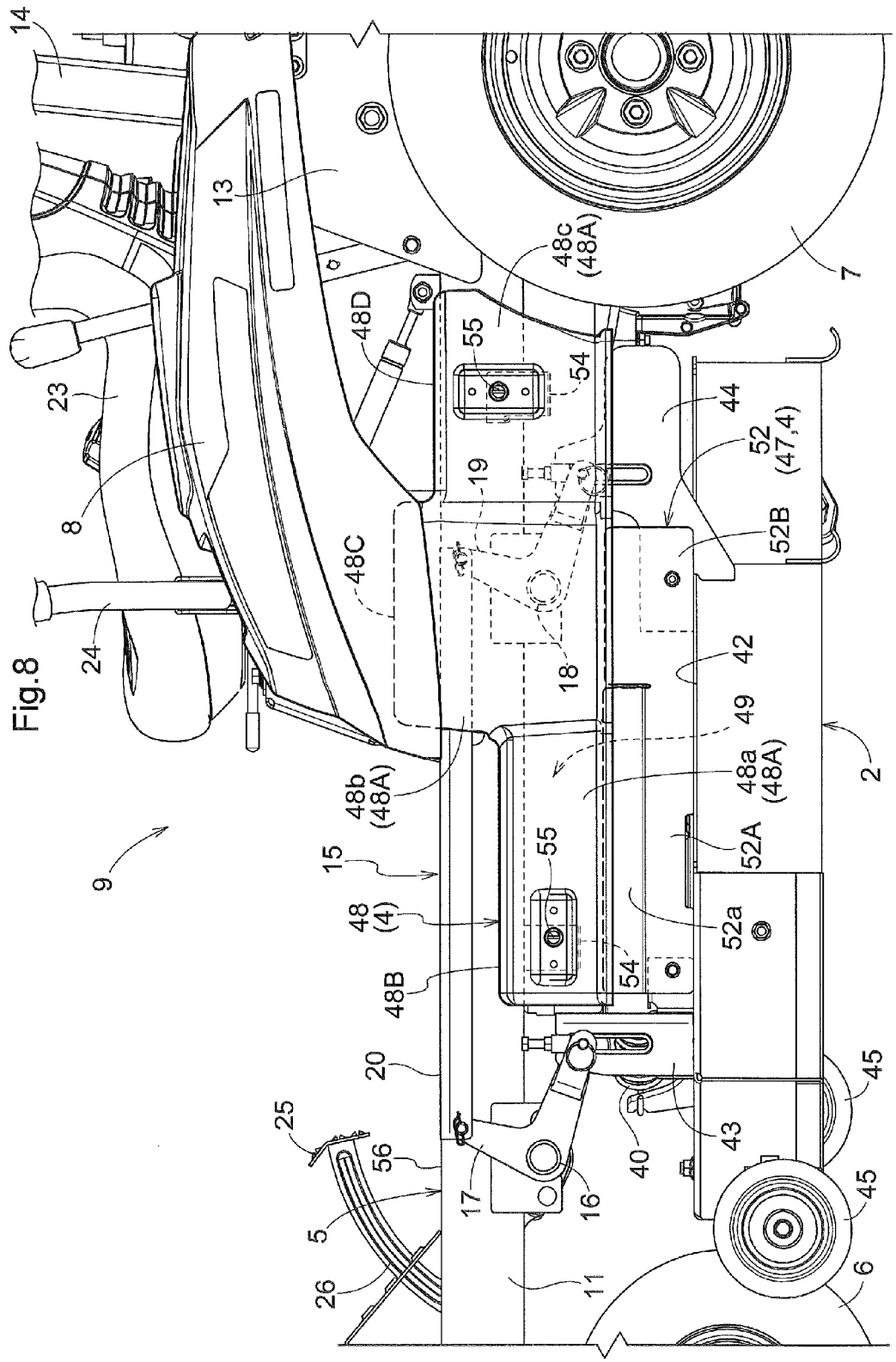
FIG. 8 is a left side view of principal portions showing a state of the cover unit when the mower unit is located at the lower limit position.
Figure 9:
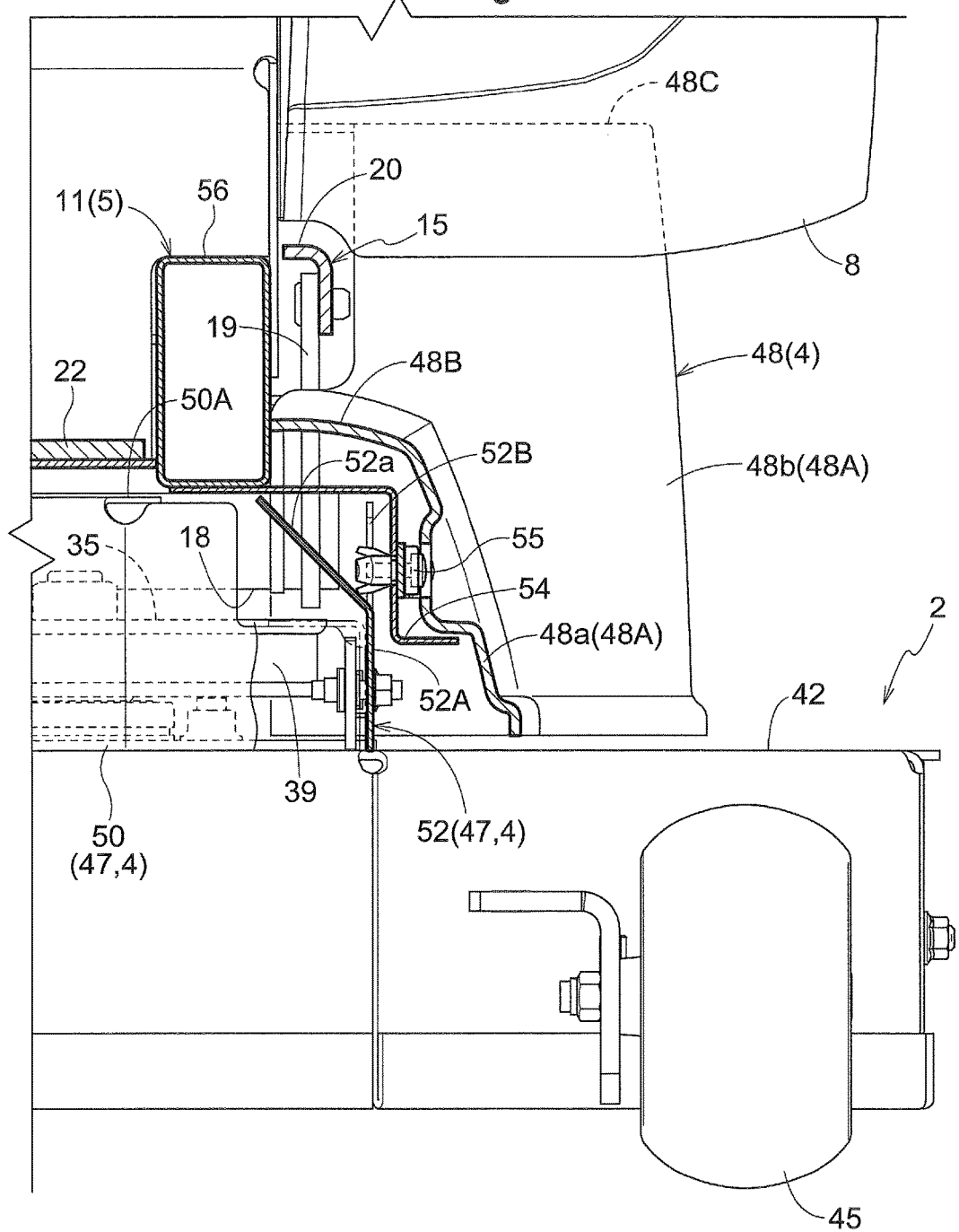
FIG. 9 is a front view in vertical section of principal portions showing a state of the cover unit when the mower unit is located at the upper limit position.
Figure 10:
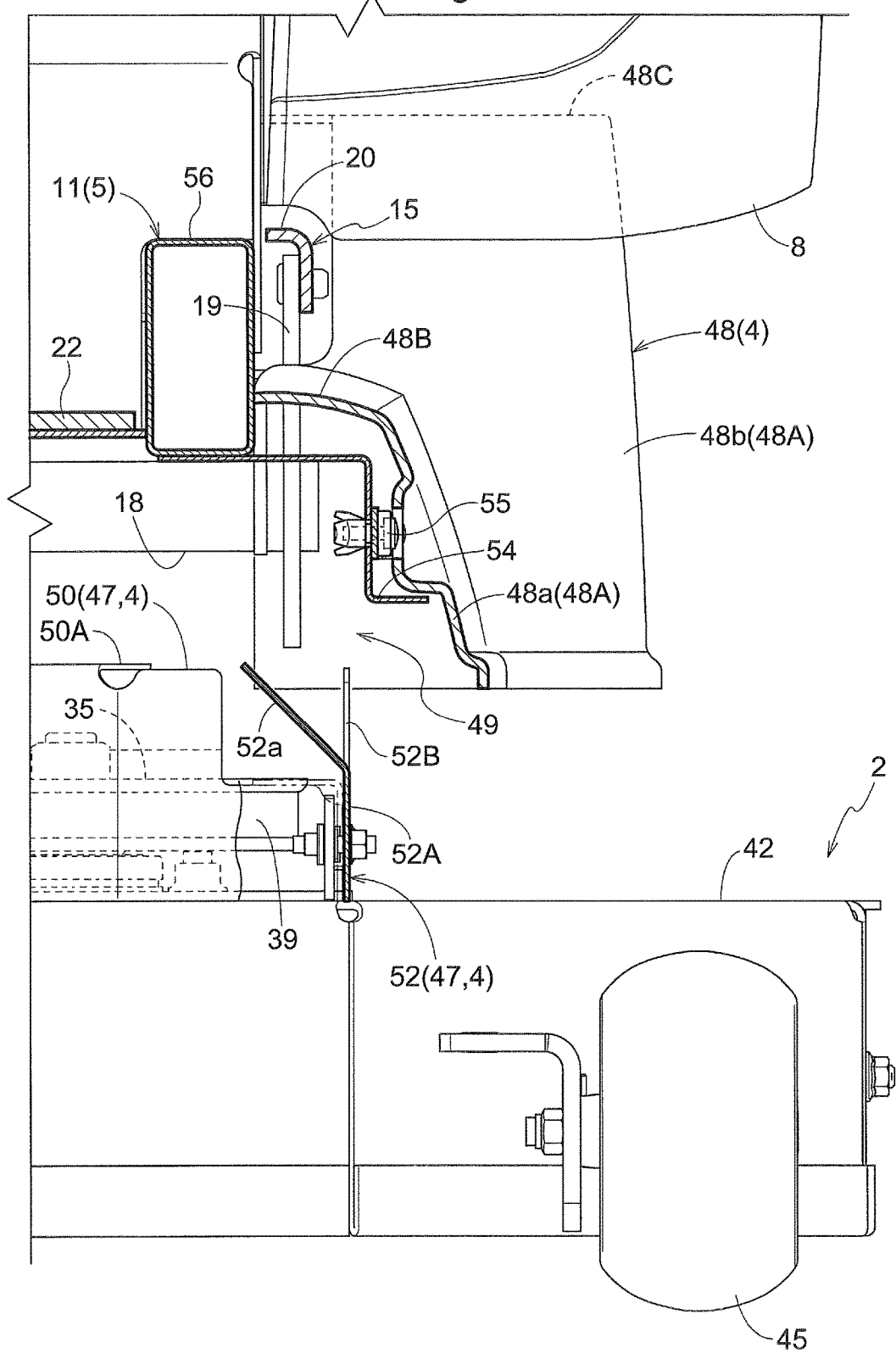
FIG. 10 is a front view in vertical section of principal portions showing a state of the cover unit when the mower unit is located at the lower limit position.

As shown in FIGS. 1-3, a mid-mount riding grass mower according to the present embodiment includes a riding type traveling vehicle body 1, a mower unit 2 liftably suspension-supported at a front/rear intermediate lower portion of the traveling vehicle body 1, a belt transmission device (to be referred to as "a first belt transmission device" hereinafter) 3 attached to an upper portion of the mower unit 2, a cover unit 4 that covers the belt transmission device 3 and so on.

The traveling vehicle body 1 includes a vehicle body frame 5 forming a framework of the machine body 6, right and left front wheels 6 of caster type, right and left rear wheels 7 whose speeds can be changed independently of each other, right and left fenders 8 covering the right and left rear wheels 7, a riding type driving section 9 mounted on a font side of the traveling vehicle body 1, an engine section 10 mounted on a rear portion of the traveling vehicle body 1 and so on.

As shown in FIGS. 1-11, the vehicle body frame 5 includes right and left side members 11 disposed at right and left opposed ends of the traveling vehicle body 1, a support plate 12 connected to rear portions of the right and left side members 11, right and left support brackets 13 extending upward from rear end portions of the right and left side members 11, an arch-shaped protective frame 14 supported to the right and left support brackets 13 and so on. At a front/rear intermediate lower portion of the vehicle body frame 5, there is mounted a parallel-link type link mechanism 15 which liftably suspension-supports the mower unit 2. The link mechanism 15 includes right and left first link members 17 pivotable together via a first pivot shaft 16 disposed on a front side, right and left second link members 19 pivotable together via a second pivot shaft 18 disposed on a rear side, a third link member 20 coupling the left side first link member 17 with the left side second link member 19 for enabling joint pivotal movement thereof and so on.

As shown in FIGS. 1-5 and FIG. 11, the right and left front wheels 6 are supported at front end portions of the right and left side members 11 to be steerable. The right and left rear wheels 7 are supported at rear portions of the vehicle body frame 5 via right and left stepless speed changer devices 21. The right and left stepless speed changer devices 21 has output shafts (not shown) thereof mounting the right and left rear wheels 7 thereon to be rotatable therewith.

As shown in FIGS. 1-5 and FIGS. 7-11, the driving section 9 includes a boarding step 22 supported at a front portion of the vehicle body frame 5, a driver's seat 23 supported to a front/rear intermediate portion of the vehicle body frame 5, right and left speed changer levers 24 disposed on right and left sides of the driver's seat 23, a foot pedal 25 disposed at a foot portion of the driving section 9 and so on.

The right and left speed changer levers 24 are operably coupled to speed changer shafts (not shown) of the right and left stepless speed changer devices 21 in response to pivotal movement thereof. With this operative coupling, when the right and left speed changer levers 24 are operated into neutral positions, the right and left stepless speed changer devices 21 provide zero outputs. When the right and left speed changer levers 24 are pivotally operated to a forward traveling speed range on more traveling vehicle body front side than the neutral positions, the right and left stepless speed changer devices 21 provide outputs of forward rotational power for forward traveling. The greater the operational amounts of the right and left speed changer levers 24 from the neutral positions, the greater the outputs. When the right and left speed changer levers 24 are pivotally operated to a reverse traveling speed range on more traveling vehicle body rear side than the neutral positions, the right and left stepless speed changer devices 21 provide outputs of reverse rotational power for reverse traveling. The greater the operational amounts of the right and left speed changer levers 24 from the neutral positions, the greater the outputs.

With the above-described arrangement in operation, by pivotally operating the right and left speed changer levers 24, the operator can make switchover to a forward straight traveling state in which the right and left rear wheels 7 are forwardly rotatably driven at an equal speed, a forward turning state in which the right and left rear wheels 7 are forwardly rotatably driven at speeds different from each other, a reverse straight traveling state in which the right and left rear wheels 7 are reversely rotatably driven at an equal speed, a reverse turning state in which the right and left rear wheels 7 are reversely rotatably driven at speeds different from each other, a pivot turning state in which one of the right and left rear wheels 7 is kept still while the other of the right and left rear wheels 7 is forwardly or reversely rotatably driven, or to a spin turning state in which the right and left rear wheels 7 are rotatably driven in directions different from each other.

As shown in FIG. 1, FIG. 2, FIG. 5, FIG. 7 and FIG. 8, a lift pedal 25 is secured to an extension end of a pivot arm 26 which extends upward from a first rotational shaft 16 to a space above the boarding step 22. With the link mechanism 15 in operation, in association with a descending pivotal motion of the pivot arm 26, the respective link members 17, 19 are pivoted upward, thereby to lift up the mower unit 2. Also, with the link mechanism 15 in operation, in association with an ascending pivotal motion of the pivot arm 26, the respective link members 17, 18 are pivoted downward, thereby to lift down the mower unit 2.

With the above, the operator can elevate the mower unit 2 to an upper retracted position by his/her stepping on the lift pedal 25. And, by releasing the stepping-on operation on the lift pedal 25, the operator can lower the mower unit 2 to a lower position for working.

As shown in FIGS. 1-6 and FIG. 11, the engine section 10 includes an engine 27 mounted to the support plate 12 in anti-vibration manner, a traveling belt transmission device (to be referred to as "a second belt transmission device" hereinafter) 28 for transmitting power from the engine 27 to the right and left stepless speed changer devices 21, a muffler 29 mounted rearwardly and downwardly of the engine 27, an engine cover 30 covering the engine 27 from the rear side thereof, a first muffler cover 31 covering the muffler 29 from the rear side thereof, a second muffler cover 32 covering the muffler 29 from the lower side thereof and so on. The second belt transmission device 28 is disposed along the lower face of the support plate 12 between the right and left side members 11.

As shown in FIGS. 1-3, FIG. 5, FIG. 6 and FIGS. 9-11, the first belt transmission device 3 includes a drive pulley 34 rotatable with an output shaft 33 of the engine 27, right and left driven pulleys 35 and an idle pulley 36 rotatably supported to the mower unit 2, a tension pulley 38 pivotally supported to the mower unit 2 via a tension arm 37, a length of transmission belt 39 entrained around the respective pulleys 34-36, 38, a tension spring 40 for urging the tension arm 37 in a belt tensioning direction and so on. In the first belt transmission device 3, its driven side disposed at a front portion of the traveling vehicle body 1 is comprised of the right and left driven pulleys 35, the idle pulley 36, the tension pulley 38 and a mower unit side of the transmission belt 39 extending around and across these pulleys 35, 36, 38, etc. Also, in the first belt transmission device 3, its drive-side disposed on a rear side of the traveling vehicle body 1 is comprised of the drive pulley 34 and the engine side of the transmission belt 39 extending from the drive pulley 34 through to the idle pulley 36 and the tension pulley 38. The right-side driven pulley 35 is disposed on a more traveling vehicle body rear side than the left-side driven pulley 35.

As shown in FIGS. 1-11, the mower unit 2 includes right and left blades 41 rotatable with the right and left drive pulleys 35, a mower deck 42 covering the right and left blades 41 from the upper sides thereof, right and left first brackets 43 pin-connected to the right and left first link members 17 of the link mechanism 15, right and left second brackets 44 pin-connected to the right and left second link members 19 of the link mechanism 5, right and left rollers 41 for riding over ground obstacles and so on. The mower unit 2 is suspension-supported by the traveling vehicle body 1, under an inclined posture offset to the right rear side with the right blade 41 being positioned on more vehicle body rear side than the left side blade 41. The right and left first brackets 43 and the right second bracket 44 extend upward from the upper face of the mower deck 42. The left second bracket 44 extends rearward and upward from the rear face of the mower deck 42. The right and left second brackets 44 have their rear ends positioned adjacent the right and left rear wheels 7.

As shown in FIG. 2, FIG. 3, FIG. 5, FIG. 6 and FIG. 11, the mower deck 42 defines, at its right end portion, a discharge opening 42A for discharging cut grass clippings. To a right end portion of the mower deck 42, a discharge cover 46 is attached to be pivotable up/down for guiding cut grass clippings discharged from the discharge opening 42A to a right outer side of the traveling vehicle body 1. Namely, this mower unit 2 is designed as a side discharge type for discharging cut grass clippings to the rear outer side of the traveling vehicle body 1.

As shown in FIGS. 1-10, the cover unit 4 includes a lower cover 47 extending upward from a position on more traveling vehicle body outer side than the first belt transmission device 3 in the mower deck 42, right and left side covers 48 detachably attached to right and left end portions of the traveling vehicle body 1 and so on. In one aspect, the lower cover 47 surrounds three sides of the first belt transmission device 3. The lower cover 47 has an upper end disposed higher than an upper end of the first belt transmission device 3 and has a vertical length for forming a maintenance space 49 relative to a front/rear intermediate lower portion of the traveling vehicle body 1 when the mower unit 2 is located at its lower limit position. The right and left side covers 48 have vertical walls 48A that are overlapped with the lower cover 47 in a lifting range of the mower unit 2 as seen in a right/left direction.

With the above-described arrangement, the driven side of the first belt transmission device 3 can be covered by the lower cover 47 and the right and left side covers 48, irrespectively of a high position of the mower unit 2. As a result, e.g. when an object such as an elongated tool is inserted beneath the traveling vehicle body 1 from the outer side of this traveling vehicle body 1, the possibility of this object coming into inadvertent contact with the driven side of the first belt transmission device 3 can be avoided.

And, when effecting a maintenance operation for the first belt transmission device 3 such as belt replacement operation, an operator can open up the gap between the lower cover 47 and the front/rear intermediate lower portion of the traveling vehicle body 1 as the maintenance space 49 by detaching the right and left side covers 48 from the traveling vehicle body 1, with the mower unit 2 being kept at its lower limit position. Through this maintenance space 49, the maintenance operation for the first belt transmission device 3 such as belt replacement operation can be carried out smoothly without inviting the inconvenience of the presence of the lower cover 47 presenting obstruction to the operation.

Moreover, attachment/detachment of the respective side covers 48 from the traveling vehicle body 1 can be carried out easily from the lateral outer side of this traveling vehicle body 1 associated therewith.

Consequently, it has become possible to achieve greater readiness of maintenance for the first belt transmission device 3 in spite of provision of the cover unit 4 for avoiding inadvertent contact of an object with the first belt transmission device 3.

As shown in FIGS. 1-3 and FIGS. 5-10, the lower cover 47 includes an inner wall body 50 disposed within a right/left width of the traveling vehicle body 1, a right outer wall body 51 disposed on the right outer side of the traveling vehicle body 1 and a left outer wall body 52 disposed on the left outer side of the traveling vehicle body 1. The inner wall body 50 has a horizontal extension portion 50A that extends horizontally from its upper end toward the first belt transmission device 3.

With this arrangement, even if a tool or the like inserted beneath the traveling vehicle body should inadvertently enter the space between the inner wall body 50 and the front/rear intermediate lower portion of the traveling vehicle body 1, the horizontal extension portion 50A can inhibit this tool or the like from being inclined towards the first belt transmission device 3 disposed downward.

As a result, the possibility of an object such as a tool coming into inadvertent contact with the driven side of the first belt transmission device 3 through the space (gap) 53 between the inner wall body 50 and the front/rear intermediate lower portion of the traveling vehicle body 1 can be avoided in an even more reliable manner.

The inner wall body 50 is provided as a steel plate which has a large right/left width extending between the right and left outer wall bodies 51, 52. The inner wall body 50 is oriented under a right rearward inclined posture, with a portion thereof obliquely extending along a forward portion of the transmission belt 39 between and across the right and left driven pulleys 35. With such an inclined orientation, the inner wall body 50 is bolt-connected to a position on more traveling vehicle body front side than the first belt transmission device 3 in the mower deck 42. At a right/left center portion of the inner wall body 50, there is formed a recess 50B for allowing insertion of the tension spring 40 of the first belt transmission device 3.

The right and left outer wall bodies 51, 52 are provided as steel plates and have a front/rear length extending from the inner wall body 50 to the right and left second brackets 44 as seen in a side view. The right outer wall body 51 is bolt-connected to a position on more traveling vehicle body right outer side than the first belt transmission device 3 in the mower deck 42. The right outer wall body 51 has its front end portion bolt-connected to a right end portion of the inner wall body 50. The left outer wall body 52 is bolt-connected to a position on more traveling vehicle body left outer side than the first belt transmission device 3 in the mower deck 42. The left outer wall body 52 has its front end portion bolt-connected to a left end portion of the inner wall body 50.

In the lower cover 47 as seen in a right/left side view, the inner wall body 50 and the right outer wall body 51 are overlapped with the vertical wall 48A of the right side cover 48. In the lower cover 47 as seen in a right/left side view, the left outer wall body 52 is overlapped with the vertical wall 48A of the left side cover 48 as seen in a side view.

As shown in FIGS. 1-10, the right and left side covers 48 are made of resin and are attached via push rivets 55 to front and rear support arms 54 provided in the right and left side members 11. With this, the operator can carry out attachment/detachment of the right and left side covers 48 to/from the traveling vehicle body 1 easily. When being attached to the traveling vehicle body 1, the right and left side covers 48 are positioned upwardly of the right or left outer wall body 51, 52, thus covering the right and left outer wall bodies 51, 52 from the upper sides thereof.

As shown in FIG. 1-4 and FIGS. 6-10, the traveling vehicle body 1 includes a boarding step 22 upwardly of the mower unit 2. The right and left side covers 48 have upper walls (to be referred to as "first upper walls" hereinafter) 48B extending from upper ends of the vertical walls 48A over and across the traveling vehicle body 1 on lateral outer sides of the boarding step 22. The right and left first upper walls 48B have end portions thereof on the vertical wall sides which extend more downward to the outer side than traveling vehicle body side end portions thereof.

With the above arrangement, when an operator gets on/off the vehicle via the boarding step 22, possibility of erroneous stepping on the first upper walls 48B of the respective side covers 48 by the operator can be decreased.

As a result, the possibility of damage to the respective side covers 48 by erroneous stepping on the upper walls 48B of the respective side covers 48 by the operator can be avoided even more reliably.

In the right and left first upper walls 48B, traveling vehicle body side end portions thereof are disposed lower than boarding faces 56 positioned on the right and left sides of the boarding step 22.

With this arrangement, it is possible to reduce the possibility of erroneous stepping on the first upper walls 48B of the respective side covers 48 by the operator who is to get on/off the vehicle via the boarding step 22.

As a result, the possibility of damage to the respective side covers 48 by erroneous stepping on the first upper walls 48B of the respective side covers 48 by the operator can be avoided even more reliably.

The right and left boarding faces 56 are formed by upper faces of the right and left side members 11 adjacent the boarding step 22.

The right and left vertical walls 48A are disposed on more outer sides of the traveling vehicle body than the lower cover 47. The lower cover 47 has right and left lateral walls (to be referred to as "first lateral walls" hereinafter) disposed downwardly of the right and left first upper walls 48B. Of the right and left first lateral walls 51A, 52A, the right first lateral wall 51A has a front end portion which has a short front/rear length not reaching a position under the push rivet 55. On the other hand, the left first lateral wall 52A has a front end portion which has a long front/rear length reaching the position under the push rivet 55. The left first lateral wall 52A has its upper portion 52a inclined toward the traveling vehicle body so as to avoid inadvertent contact with the push rivet 55 in association with elevation of the mower unit 2.

With the above-described arrangement, it is possible to avoid the possibility of inadvertent contact between the upper portion 25a of the left first lateral wall 52A and the push rivet 55 at the time of elevation of the mower unit 2, without needing to decrease the upward extension lengths of the right and left first lateral walls 51A, 52A.

Thus, even though the left first lateral wall 52A has the long front/rear length extending to the position under the push rivet 55, the condition of overlapping between the right and left first lateral walls 51A, 52A and the right and left vertical walls 48A as seen in the side view can be maintained, without needing to decrease the lift range of the mower unit 2.

Consequently, irrespectively of the front/rear length of the right and left first lateral walls 51A, 52A, the possibility of inadvertent contact between an object such as a tool and the driven side of the first belt transmission device 3 can still be avoided.

As shown in FIGS. 1-8, in the traveling vehicle body 1, the output shaft 33 of the engine 27 which constitutes an output shaft of the engine section 10 extends downward toward a space between the right and left rear wheels 7. Thus, the first belt transmission device 3 extends from between the right and left rear wheels 7 toward the mower unit 2. The right and left side covers 48 extend to vicinities of the right and left rear wheels 7.

With the above-described arrangement, the drive pulley side of the first belt transmission device 3 disposed between the lower cover 47 and the right and left rear wheels 7 can be covered by the right and left side covers 48. Thus, it is possible to avoid the possibility of a tool or the like coming into inadvertent contact with the drive pulley side of the first belt transmission device 3 through between the lower cover 47 and the right and left rear wheels 7.

And, when a maintenance operation such as belt replacement operation is to be effected for the first belt transmission device 3, the operator will detach the right and left side covers 48 from the traveling vehicle body 1 with placing the mower unit 2 at its lower limit position, whereby the maintenance space 49 between the lower cover 47 and the front/rear intermediate lower portion of the traveling vehicle body 1 can be opened up to extend to between the lower cover 47 and the right and left rear wheels 7. And, through this front/rear extended maintenance space 49, the maintenance operation such as belt replacement operation for the first belt transmission device 3 can be carried out.

As a result, it is possible to avoid the possibility of an object such as a tool coming into inadvertent contact with the drive pulley side of the first belt transmission device 3, without impairing the maintenance readiness for the first belt transmission device 3.

In the right and left second brackets 44 of the mower unit 2, as described above, the right and left outer wall bodies 51, 52 have the front/rear length extending from the inner wall body 50 to the right and left second brackets 44, and also the rear ends of the respective second brackets 44 extend to the vicinities of the right and left rear wheels 7. Thus, the right and left second brackets 44 act as covers that extend from rear sides of the right and left outer wall bodies 51, 52 to the vicinities of the right and left rear wheels 7.

As shown in FIG. 1, FIG. 2, FIG. 4 and FIGS. 6-10, each one of the right and left side covers 48 includes a first upper wall 48B positioned on a lateral outer side of the boarding step 22, a second upper wall 48C positioned on a traveling vehicle body rear side of the first upper wall 48B and on traveling vehicle body upper side of the first upper wall 48B, and a third upper wall 48D positioned on traveling vehicle body rear side of the second upper wall 48C and having its height between the first upper wall 48B and the second upper wall 48C. The right and left second upper walls 48C and the right and left third upper walls 48D extend undersides of the right and left fenders 8. The right and left second upper walls 48C extend into the front sides of the right and left fenders 8 adjacent the right and left side members 11. The right and left third upper walls 48D are located on traveling vehicle body upper side than the upper faces of the right and left side members 11.

The right and left vertical walls 48A each includes a first vertical wall portion 48a extending downward from the first upper wall 48B, a second vertical wall portion 48b extending downward from the second upper wall 48C and a third vertical wall portion 48c extending downward from the third upper wall 48D. And, the front side first vertical wall portion 48a and the rear side third vertical wall portion 48c are coupled to the front and rear support arms 54 via the push rivets 55 and the rear portion of the third vertical wall portion 48c is disposed adjacent the rear wheel 7.

As shown in FIG. 1, FIG. 2 and FIGS. 5-10, the right outer wall body 51 includes a first lateral wall 51A disposed downwardly of the right first upper wall 48B, a second lateral wall 51B disposed downwardly of the right second upper wall 48C, and a third lateral wall 51C disposed downwardly of the right third upper wall 48D. The left outer wall body 52 includes a first lateral wall 52A disposed downwardly of the left first upper wall 48B and a second lateral wall 52B disposed downwardly of the left second upper wall 48C.

As shown in FIG. 1, FIG. 2, FIG. 5, FIG. 6 and FIG. 11, the cover unit 4 includes a drive-side cover 57. The drive-side cover 57 extends downward from the traveling vehicle body 1 at a position on more traveling vehicle body outer side than the drive pulley 34 between the right and left rear wheels 7. The drive-side cover 57 has a lower end which is located lower than an lower end of the drive pulley 34.

With the above-described arrangement, the drive pulley side of the first belt transmission device 3 disposed between the right and left rear wheels 7 can be covered by the drive-side cover 57 disposed closer to a rear end side of the traveling vehicle body 1 than the drive pulley 34.

As a result, it is possible to avoid the possibility of an object, such as a tool inserted beneath the traveling vehicle body 1 from the rear end side of the traveling vehicle body 1, coming into inadvertent contact with the drive pulley side of the first belt transmission device 3 from between the right and left rear wheels 7.

The drive pulley side of the first belt transmission device 3 is located between the right and left stepless speed changer devices 21. The drive side cover 57 has its right and left opposed end portions extending forwardly toward the right and left stepless speed changer devices 21.

With the above arrangement, the possibility of an object, such as a tool inserted beneath the traveling vehicle body 1 from the rear end side of the traveling vehicle body 1, coming into inadvertent contact with the drive pulley side of the first belt transmission device 3 from between the right and left rear wheels 7 can be avoided even more reliably.

Other Embodiments

The present disclosure is not limited to the arrangements illustrated and described in the foregoing embodiment. Next, some typical alternative embodiments of this disclosure will be described.

[1] The mid-mount riding grass mower can mount a grass collector vessel for storing cut grass clippings.

[2] The configuration of the traveling vehicle body 1 can be modified in various ways.

For instance, the traveling vehicle body 1 can include steerable right and left front wheels 6 and a steering wheel for steering the front wheel, and so on.

For another instance, the traveling vehicle body 1 can mount the engine section 10 on the front side thereof and the driving section 9 on the rear side thereof.

For still another instance, the traveling vehicle body 1 can be configured as an electric type specification having an electric motor instead of the engine 27.

For still further instance, the traveling vehicle body 1 can be configured as a hybrid type specification having both the engine 27 and an electric motor.

For still yet further instance, the traveling vehicle body 1 can have, as transmission devices mounted thereon for a work implement, the belt transmission device 3 attached to an upper portion of the mower unit 2, and a shaft type transmission device for transmitting power from the output shaft 33 of the engine section 10 to the belt transmission device 3.

[3] The configuration of the mower unit 2 can be modified in various ways.

For instance, the mower unit 2 can be configured as a rear discharge type specification for discharging cut grass clippings to the rear side of the mower unit 2.

For another instance, the mower unit 2 can be configured as a mulching type specification configured to fine-cut grass clippings and discharge the resultant clippings to the lower side of the mower unit 2.

For still another instance, the mower unit 2 can be configured as an electrical driven type specification having an electric motor for the work implement.

For still further instance, the mower unit 2 can be configured such that the unit 2 is suspension-supported by the traveling vehicle body 1 under a left rearward inclined posture, with the left blade 41 being disposed on more vehicle body rear side than the right blade 41.

For still yet further instance, the mower unit 2 can be configured such that the right and left blades 41 are disposed rightly side by side.

For still yet further instance, the mower unit 2 can include a single blade 41, or can include three or more blades 41.

[4] The configuration of the belt transmission device 3 can be modified in various ways.

For instance, the belt transmission device 3 can be separated into two, including a "driven side" belt transmission device attached to the upper portion of the mower unit 2, and a "driving side" belt transmission device which is configured to transmit power from the output shaft 33 of the engine section 10 to this "driven side" belt transmission device.

For another instance, the belt transmission device 3 can be configured such that power is transmitted form an electric motor for a work implement mounted on the mower unit 2 to the blades 41.

[5] The layout and configuration of the engine section 10 can be modified in various ways.

For instance, the engine section 10 can be mounted on a front side of the traveling vehicle body 1. In this case, the engine section 10 can include an output shaft 33 extending downward toward a space between the right and left front wheels 6.

For another instance, the engine section 10 can include the engine 27 and a speed changer device inputting power from the engine 27, wherein the output shaft 33 of the engine section 10 can be configured as a PTO shaft allowing power takeoff for a work implement from the speed changer device.

[6] The configuration of the cover unit 4 can be modified in various ways, in accordance with e.g. implement power transmission arrangement.

For instance, if the implement power transmission arrangement is provided such that the engine section 10 is disposed on a front side of the traveling vehicle body 1 and the belt transmission device 3 extends from the output shaft 33 of the engine section 10 to the mower unit 2, the cover unit 4 can be provided with a drive side cover 57 which extends downward from the traveling vehicle body 1 at a position on more vehicle body front side than the drive pulley 34 between the right and left front wheels 6.

For another instance, if the implement power transmission arrangement includes the belt transmission device 3 attached to the upper portion of the mower unit 2, and also includes the shaft transmission device for transmitting power from the output shaft 33 of the engine section 10 to the belt transmission device 3, the cover unit 4 can omit the drive side cover 57.

For still another instance, if the implement power transmission arrangement is configured such that the mower unit 2 includes an electric motor for a work implement and the belt transmission device 3 is disposed only at an upper region of the mower unit 2, the cover unit 4 can omit the drive side cover 57. Instead thereof, the cover unit 4 can include the lower cover 47 surrounding the circumference of the belt transmission device 3, and the right and left side covers 48 having the vertical walls 48A overlapped with the lower cover 47 as seen in the right/left direction.

For still further instance, if the mower unit 2 is configured such that the right and left blades 41 are disposed rightly side by side, the attaching posture of the inner wall body 50 of the cover unit 4 can be a right/left oriented posture along the belt portion of the transmission belt 39 extending between and across the right and left driven pulleys 35 rotatable with the right and left blades 41. In this case, the right outer wall body 51 and the left outer wall body 52 of the lower cover 47 can be of a same shape having a same front/rear length.

For still yet further instance, if the mower unit 2 is configured such that three blades 41 are disposed in a triangular layout, the cover unit 4 can be configured such that the shape of the inner wall body 50 has a V-shape in a plan view along the belt portion of the transmission belt 39 extending between and across the three driven pulleys 35 rotatable with the respective blades 41.

[7] The right and left side covers 48 can include connecting portions enabling connection with the right and left end portions of the traveling vehicle body 1, at positions offset from the regions overlapped with the lower cover 47 as seen in the right/left direction.

[8] The right and left side covers 48 can be detachably connected via bolts/nuts to the right and left end portions of the traveling vehicle body 1.

[9] The right and left side covers 48 can be formed of steel plates so as to act also as boarding steps with high rigidity thereof.

[10] The lower cover 47 can be configured such that the inner wall body 50, the right outer wall body 51 and the let outer wall body 52 of the lower cover 47 are formed integral with one another.

[11] The lower cover 47 can be configured such that the right and left outer wall bodies 51, 52 have a front/rear length extending to the vicinities of the right and left wheels (the front wheels 6 or the rear wheels 7) so as to cover, from the lateral outer side, the drive pulley side of the first belt transmission device 3 disposed between the mower deck 42 and the right and left rear wheels 7.

[12] The lower cover 47 can be configured such that the right and left first brackets 43 and/or the right and left second brackets 44 are formed integral with the right and left outer wall bodies 51, 52.

[13] The lower cover 47 can be configured such that the upper portions of the right and left lateral walls (first lateral walls) 51A, 52A are inclined toward the traveling vehicle body side, and that the upper ends of the respective lateral walls 51A, 52A are disposed at positions downwardly of the traveling vehicle body side of the upper walls (first upper walls) 48B of the right and left side covers 48.

With the above configuration, even when the upper walls 48B of the right and left side covers 48 are formed to extend downward to the outer side, with the vertical wall sides of the respective upper walls 48B being further lowered in order to avoid the possibility of inadvertent stepping on by the operator even more reliably, the inadvertent contact between the upper portions of the respective side walls 51A, 52B and the upper walls 48B or the like at the time of elevation of the mower unit 2 can still be avoided, without needing to decrease the upward extension lengths of the respective lateral walls 51A, 52A. With this, the state of the right and left lateral walls 51A, 52A being overlapped with the vertical walls 48A of the right and left side covers 48 as seen in the right/left direction can be maintained, without needing to decrease the lift range of the mower unit 2.

As a result, without decreasing the lift range of the mower unit 2, it is still possible to provide the measure for further reliably avoiding the possibility of inadvertent contact between an object such as a tool and the belt transmission device 3 and also avoiding the damage resulting from inadvertent operator's stepping on the right and left side covers 48.

What is claimed is:

1. A mid-mount riding grass mower comprising:
a traveling vehicle body;
a mower unit liftably suspension-supported at a front/rear intermediate lower portion of the traveling vehicle body;
a belt transmission device attached to an upper portion of the mower unit; and
a cover unit that covers the belt transmission device;
wherein the mower unit includes a blade rotatable with a driven pulley of the belt transmission device, and a mower deck that covers the blade from the above;
the cover unit includes a lower cover extending upward from the mower deck so as to surround three sides of the belt transmission device, and right and left side covers detachably attached to right and left end portions of the traveling vehicle body;
the lower cover has an upper end disposed higher than an upper end of the belt transmission device, the lower cover having a vertical length for forming a maintenance space relative to the front/rear intermediate lower portion of the traveling vehicle body when the mower unit is located at its lower limit position; and
each of the right and left side covers has a vertical wall that overlaps respective outermost sides of the lower cover as seen in a right/left direction in a lifting range of the mower unit.

2. The mid-mount riding grass mower according to claim 1, wherein:
the lower cover includes an inner wall body disposed within a right/left width of the traveling vehicle body, and right and left outer wall bodies disposed on the lateral outer sides of the traveling vehicle body; and
the inner wall body has a horizontal extension portion that extends horizontally from an upper end of the inner wall body toward the belt transmission device.

3. The mid-mount riding grass mower according to claim 1, wherein:
the traveling vehicle body includes a boarding step upwardly of the mower unit;
each of the right and left side covers has an upper wall extending from an upper end of the vertical wall associated therewith over and across the traveling vehicle body on a lateral outer side of the boarding step associated therewith; and
the upper wall has a vertical wall side end portion thereof which extends more downward to the outer side than a traveling vehicle body side end portion thereof.

4. The mid-mount riding grass mower according to claim 3, wherein each of the right and left upper walls has a traveling vehicle body side end portion thereof disposed lower than a boarding face positioned on the right and left sides of the boarding step.

5. The mid-mount riding grass mower according to claim 3, wherein:
the right and left vertical walls are disposed on more outer sides of the traveling vehicle body than the lower cover;
the lower cover has right and left lateral walls disposed downwardly of the right and left upper walls; and
each of the right and left lateral wall has an upper portion which is inclined toward the traveling vehicle body side, and an upper end portion which is disposed downwardly of the traveling vehicle body side end portion of the right/left upper wall associated therewith.

6. The mid-mount riding grass mower according to claim 1, wherein:
the traveling vehicle body includes right and left wheels, and an engine section having an output shaft extending downward toward a space between the right and left wheels;
the belt transmission device includes a drive pulley rotatable with the output shaft; and
the right and left side covers extend to respective vicinities of the right and left wheels.

7. The mid-mount riding grass mower according to claim 6, wherein:
the cover unit includes a drive-side cover which extends downward from the traveling vehicle body, at a position outside of the drive pulley in the traveling vehicle body front/rear direction between the right and left wheels; and
the drive-side cover has a lower end thereof which is located lower than a lower end of the drive pulley.

8. A mid-mount riding grass mower comprising:
a traveling vehicle body;
a mower unit liftably suspension-supported at a front/rear intermediate lower portion of the traveling vehicle body;
a belt transmission device attached to an upper portion of the mower unit; and
a cover unit that covers the belt transmission device;
wherein the mower unit includes a blade rotatable with a driven pulley of the belt transmission device, and a mower deck that covers the blade from above;
the cover unit includes right and left side covers detachably attached to right and left end portions of the traveling vehicle body, and a lower cover extending from the mower deck between the right and left side covers, and;

the lower cover has an upper end disposed higher than an upper end of the belt transmission device, the lower cover having a vertical length for forming a maintenance space relative to the front/rear intermediate lower portion of the traveling vehicle body when the mower unit is located at its lower limit position; and each of the right and left side covers has a vertical wall that is overlapped with the lower cover as seen in a right/left direction in a lifting range of the mower unit, wherein the traveling vehicle body includes a boarding step upwardly of the mower unit;

each of the right and left side covers has an upper wall extending from an upper end of the vertical wall associated therewith over and across the traveling vehicle body on a lateral outer side of the boarding step associated therewith; and the upper wall has a vertical wall side end portion thereof which extends more downward to the outer side than a traveling vehicle body side end portion thereof.

9. The mid-mount riding grass mower according to claim 8, wherein:

the lower cover includes an inner wall body disposed within a right/left width of the traveling vehicle body, and right and left outer wall bodies disposed on the lateral outer sides of the traveling vehicle body; and the inner wall body has a horizontal extension portion that extends horizontally from an upper end of the inner wall body of the belt transmission device.

10. The mid-mount riding grass mower according to claim 8, wherein each of the right and left upper walls has a traveling vehicle body side end portion thereof disposed lower than a boarding face positioned on the right and left sides of the boarding step.

11. The mid-mount riding grass mower according to claim 8, wherein:

the right and left vertical walls are disposed on more outer sides of the traveling vehicle body than the lower cover;

the lower cover has right and left lateral walls disposed downwardly of the right and left upper walls; and each of the right and left lateral wall has an upper portion which is inclined toward the traveling vehicle body side, and an upper end portion which is disposed downwardly of the traveling vehicle body side end portion of the right/left upper wall associated therewith.

12. The mid-mount riding grass mower according to claim 8, wherein:

the traveling vehicle body includes right and left wheels, and an engine section having an output shaft extending downward toward a space between the right and left wheels;

the belt transmission device includes a drive pulley rotatable with the output shaft; and the right and left side covers extend to respective vicinities of the right and left wheels.

13. The mid-mount riding grass mower according to claim 12, wherein:

the cover unit includes a drive-side cover which extends downward from the traveling vehicle body, at a position outside of the drive pulley in the traveling vehicle body front/rear direction between the right and left wheels; and the drive-side cover has a lower end thereof which is located lower than a lower end of the drive pulley.

* * * * *